United States Patent [19]
Cuer et al.

[11] 4,108,963
[45] Aug. 22, 1978

[54] PROCESS FOR PURIFYING PHOSPHORIC ACID

[75] Inventors: Jean-Pierre Cuer, Colombes; Antoine Floreancig, Mitry Mory, both of France

[73] Assignee: Produits Chimiques Ugine Kuhlmann, Paris, France

[21] Appl. No.: 797,181

[22] Filed: May 16, 1977

Related U.S. Application Data

[63] Continuation of Ser. No. 586,712, Jun. 13, 1975, abandoned.

[30] Foreign Application Priority Data

Jun. 25, 1974 [FR] France .................. 74 22031

[51] Int. Cl.² .............................................. C01B 25/16
[52] U.S. Cl. ................................................. 423/321 S
[58] Field of Search .................. 423/321 R, 321 S

[56] References Cited

U.S. PATENT DOCUMENTS

| | | | |
|---|---|---|---|
| 1,929,441 | 10/1933 | Milligan | 423/321 S |
| 1,929,442 | 10/1933 | Milligan | 423/321 S |
| 3,318,661 | 5/1967 | Schallert et al. | 423/321 S |
| 3,367,738 | 2/1968 | Schallert et al. | 423/321 S |
| 3,458,282 | 8/1969 | Koerner et al. | 423/321 S |
| 3,479,139 | 11/1969 | Koerner | 423/321 S |
| 3,607,029 | 9/1971 | Goret et al. | 423/321 S |
| 3,694,153 | 9/1972 | Williams et al. | 423/321 S |
| 3,723,606 | 3/1973 | Klingelhoefer | 423/321 S |
| 3,963,247 | 9/1975 | Blumberg et al. | 423/321 S |
| 3,978,196 | 8/1976 | Toshimitsu et al. | 423/321 S |

FOREIGN PATENT DOCUMENTS 1,292,338  3/1962  France ..................... 423/321 S

OTHER PUBLICATIONS

Agr. & Food Chem.–vol. 22–No. 6–pp. 1099–1106.

*Primary Examiner*—O. R. Vertiz
*Assistant Examiner*—Eugene T. Wheelock
*Attorney, Agent, or Firm*—Pennie & Edmonds

[57] ABSTRACT

Wet-process phosphoric acid is purified sufficiently to take the place of purified thermal-process acid by a method which comprises (1) contacting an initial aqueous phase of a crude wet-process phosphoric acid with a water-immiscible solvent for phosphoric acid and allowing phosphoric acid and anionic impurities to be extracted or charged into said solvent leaving the cationic impurities in the first aqueous phase; (2) mechanically separating the charged solvent from the initial aqueous phase and contacting the charged solvent with water to allow the phosphoric acid and anionic impurities to be re-extracted into a second aqueous phase; (3) contacting the second aqueous phase with a water-immiscible alkaline liquid medium and allowing the anionic impurities to be transferred to said alkaline medium; and (4) mechanically separating the second aqueous phase containing pure phosphoric acid.

13 Claims, No Drawings

PROCESS FOR PURIFYING PHOSPHORIC ACID

This is a continuation, of application Ser. No. 586,712 filed June 13, 1975, now abandoned.

The present invention provides a procedure for purifying wet-process phosphoric acid. As is well known, in the wet process, phosphoric acid is made by leaching phosphate rock with sulfuric acid. The resulting acid is relatively impure. While it is not necessary to purify the crude wet-process phosphoric acid for making fertilizer grades of triple super phosphate or fertilizer ammonium phosphate, for most other purposes it must be purified, particularly if it is to compete with the purer grades of thermal process phosphoric acid prepared by the burning of elemental phosphorus.

BACKGROUND OF THE INVENTION

The wet-process for manufacture of phosphoric acid is described in KIRK-OTHMER "ENCYCLOPEDIA OF CHEMICAL TECHNOLOGY" (1964) Vol. 9, page 87 et seq.; Vol. 15, page 261 et seq. Common impurities include sulfate, fluoride, chloride, iron, aluminum, vanadium, chromium, calcium, sodium and ammonium.

In view of the fact that specific details depend to a great extent on the original rock and the degree of purity desired, a detailed description of any one operation would not be typical of the industry. The prior art has in general considered it a necessity to employ a succession of precipitations followed by filtering or other forms of mechanical separation.

Thus, for example, gradual increase in pH by addition of soda ash can successively precipitate the phosphates of iron, aluminum and finally alkaline earths. According to some approaches, sodium silicate has been advocated to remove fluorine, or alternatively, superheated steam is blown through concentrated phosphoric acid to reduce the fluorine content. Iron and vanadium have been removed from the acid by addition of potassium ferrocyanide (A. V. SLACK - Phosphoric Acid (1968) part II, p 687 et seq)

Frequently, these prior-art methods have been both cumbersome in themselves and fraught with subsequent cumbersome complications. Thus, when precipitating agents are added as aqueous solutions, the acid is diluted and must be concentrated, sometimes repeatedly. The concentrations of phosphoric acid by evaporation must be carried out in corrosion-resistant equipment such as hard-lead vacuum evaporators or by blowing hot air or combustion gases at extremely high temperatures through carbon nozzles submerged in a shallow stream of acid flowing down a long trough.

Extractions by various solvents have also been attempted as means of carrying out individual purification steps. Such solvents have included, for example, alcohols, ethers, alkyl phosphates, amines and organosulfonic acids. However, to the best knowledge of present inventors, no systematic succession of extractions has been proposed which is aimed at successful preparation of a phosphoric acid product having extremely high purity. Regardless of the solvent chosen, it has not been possible to obtain with a simple extraction of wet-process phosphoric acid, a product sufficiently pure to take the place of purified thermal-process phosphoric acid in any of its numerous high-purity applications (Phosphorus and its compounds-VAN WAZER (1961) vol II p 1051 et seq)

In some instances, the early failures have been attributable to using solvents which are selective toward cations but much less selective toward anionic impurities which often include sulfuric, hydrofluoric, hydrochloric and fluosilicic acids, whose behavior in extraction is very similar to that of phosphoric acid itself.

It has been proposed to eliminate certain of these impurities by supplementary treatments with precipitating agents, during or after the treatment with solvent, but such treatments are relatively complicated, are rarely quantitative, and do not eliminate all the above mentioned impurities.

It has also been proposed to purify wet-process phosphoric acid by two successive extraction stages both using amines as solvents, but with such a procedure only a small part of the $H_3PO_4$ is recoverable as pure aqueous extract (ROSE R.A. (MONSANTO) U.S. Pat. No. 3,865,439 - Aug. 15, 1971)

SUMMARY OF THE INVENTION

Present applicants have now found a two-part extraction method which is capable of preparing in good yield an extremely pure grade of phosphoric acid from a concentrated aqueous solution of wet-process phosphoric acid. In the first part, the cationic impurities are separated by extracting the phosphoric acid and anionic impurities into a water-immiscible solvent, leaving the cationic impurities behind. The phosphoric acid and anionic impurities are then re-extracted by water and in the second part, the anionic impurities are separated by extracting them into a water-immiscible alkaline liquid medium and leaving a surprisingly pure grade of aqueous phosphoric acid.

In one embodiment of the new method, the crude wet-process phosphoric acid is first treated with a reducing agent such as a sulfide or a metal-like iron. In this way, elements such as chromium and vanadium which can initially be present in anionic complexes of high oxidative levels, such as chromate or vanadate, are converted to cationic forms of lower oxidation levels which can then be removed in the first extraction directed to cationic impurities.

Thus, the present invention is a purification method comprising (1) contacting an initial aqueous phase of a crude wet-process phosphoric acid with a water-immiscible solvent for phosphoric acid and allowing phosphoric acid and anionic impurities to be extracted or charged into said solvent leaving the cationic impurities in the first aqueous phase; (2) mechanically separating the charged solvent from the initial aqueous phase and contacting the charged solvent with water to allow the phosphoric acid and anionic impurities to be re-extracted into a second aqueous phase; (3) contacting the second aqueous phase with a water-immiscible alkaline liquid medium and allowing the anionic impurities to be transferred to said alkaline medium; and (4) mechanically separating the second aqueous phase containing pure phosphoric acid.

Thus, in the two-part extraction method of this invention, steps (1) and (2) belong to the first part removing cationic impurities and steps (3) and (4) belong to the second part removing anionic impurities.

This invention relates also to supplementary steps whereby the solvent charged in the first part with phosphoric acid (and anionic impurities), after mechanical separation from the initial aqueous phase as recited in step (2) but before being re-extracted or regenerated by an aqueous phase, is first washed one or more times with water, saving the wash-waters for later use a diluent for alkali or ammonia for purposes of regenerating the respective solvents and forming by-product aqueous solutions of alkali-metal or ammonium phosphate.

Thus, this invention relates also to supplementary steps whereby the water immiscible solvent in the first part is regenerated by extraction with aqueous concentrated sodium hydroxide solution to produce a solvent sufficiently pure for recycled use in step (1), and a by-product aqueous sodium phosphate solution useful in the manufacture of fertilizers.

Likewise, this invention relates also to supplementary steps whereby the water-immiscible alkaline liquid medium in the second part, after its extraction of the anionic impurities and a quantity of phosphoric acid, is regenerated by treating it with ammonia and wash waters to produce an alkaline solvent sufficiently pure for recycle use in step (3) and a by-product aqueous ammonium phosphate solution is simultaneously formed which is useful in the manufacture of fertilizer.

DETAILED DESCRIPTION

The liquid-liquid extractions of the method of this invention are most conveniently carried out at ambient or room temperature; however, possible variations in temperature from 20° to 60° C will be evident to those skilled in the art. To obtain highest efficiency in production, it is desirable to operate with phosphoric acid solutions of high concentration; thus it is particularly suitable to start with crude wet-process acid having a $P_2O_5$ content from about 28 to 60% by weight.

In the method of this invention the cationic impurities are first separated from the phosphoric acid by extracting away from them the phosphoric acid and some of the anionic impurities. For this extraction a solvent is used which has limited solubility in water or aqueous phosphoric acid but good dissolving power for phosphoric acid. While most solvents for phosphoric acid are satisfactory for this purpose, it is particularly suitable to use, singly or in mixture, monoalcohols or ethers having from 4 to 8 carbon atoms. These useful solvents include n-butyl alcohol, isobutyl alcohol, tertiary butyl alcohol, secondary butyl alcohol, amyl alcohol, isoamyl alcohol, tertiary amyl alcohol, n-hexyl alcohol, cyclohexyl alcohol, 2-ethyl-butyl alcohol, heptyl alcohol, n-octyl alcohol, isooctyl alcohol, 2-ethylhexyl alcohol; di-isopropyl ether, di-n-butyl ether, di-isobutyl ether, di-secondary butyl ether, di-tertiary butyl ether, n-butyl-tertiary butyl ether; methyl amyl ether, methyl hexyl ether, methyl cyclohexyl ether, methyl heptyl ether, ethyl butyl ether, ethyl isobutyl ether, ethyl propyl ether and the like. A particularly convenient source of alcohols suitable for this purpose are those obtained singly or in mixtures from the Oxo process of hydroformylating olefins, making use also of well known processing steps such as cracking, aldol condensation, hydrogenation and the like. A product known commercially as $C_5$-OXO-alcohol is particularly suitable.

After the solvent, exemplarily an alcohol or ether such as above described, is charged with phosphoric acid in an extraction train of one or more steps, it is washed or contacted one or more times with water to provide a diluent for subsequent use for regeneration of the solvent, and the phosphoric acid is then re-extracted out of the charged solvent by water to form an aqueous phosphoric acid solution. Throughout the operation, adjustments are made in the respective flow rates of the aqueous and non-aqueous phases and the number of steps used for each liquid-liquid contact, in a manner depending on the relative amounts of cationic impurities present, so as to optimize the efficiency of removal and obtain a phosphoric acid substantially free of cations, although still containing a certain quantity of anionic impurities. The procedure can be adapted to a counter-current operation by adoption of any of the procedural advances known to those trained in the art. (See the summary of "Liquid-Liquid Extraction" in KIRK-OTHMER, "ENCYCLOPEDIA OF CHEMICAL TECHNOLOGY" (1964) Volume 8, page 719 et seq.).

The washed solvent used in the first part is then recycled to the initial extraction. It is advantageous to treat the washed solvent first with an aqueous solution of alkali metal hydroxide or ammonia. In this way certain organic impurities are eliminated and acids which have accumulated in the solvent are removed. According to the alkali used, the aqueous layer then contains ammonium or, say, sodium phosphates which can be exploited as sodium tripolyphosphate or as ammonium or sodium phosphate fertilizers. The alkaline aqueous treatment can be applied to the entire amount of used solvent or to a part thereof.

The second part of the method of this invention is then directed to separation of the remaining anionic impurities in the aqueous phosphoric acid freed of cationic impurities. Since cationic impurities are substantially absent, the anionic impurities are essentially in the form of acids such as sulfuric acid, hydrofluoric acid and hydrochloric acid. It is advantageous to concentrate the cation-free acid by evaporation to about 35-45% by weight $P_2O_5$. In this manner small amounts of the first solvent dissolved in the aqueous phosphoric acid are also eliminated.

The second solvent used for removal of anionic (acid) impurities is an alkaline liquid medium with substantial insolubility in water or aqueous phosphoric acid and poor dissolving power for phosphoric acid. Substances which are particularly satisfactory in possessing such properties are the secondary and tertiary amines having long water-insoluble hydrocarbon chains and, in particular, the solutions of such amines in diluent liquids which have both high compatibility with the amine and substantially no compatibility with the phosphoric acid.

The amines suitable for use as extractants for anionic impurities in the method of this invention are the secondary and tertiary amines having a total of from 18 to 60 carbon atoms. Thus, the amine can be, for example, trihexylamine, trioctylamine, dihexyl octylamine, didodecylamine, ditetradecylamine, dioctadecylamine, tridodecylamine, trieicosylamine, N,N-dimethyldodecylamine, NN-diethyltetradecylamine, N,N-dimethylhexadecylamine and the like, either singly or in mixtures as, for example, in commercial amine products containing alkyls having a range of chain lengths such as tricocoamine or isooctyldicocoamine. Commerical products which have been found particularly suitable are Amberlite LA 2, a proprietary product of Rohm and Haas containing as principal constituent dilaurylamine; and also Alamine 336 available from General Mills containing, as chief constituent, tricaprylamine.

The above exemplified amines are capable of providing benefits of the instant invention when used by themselves singly or in mixtures with each other, being thus capable of extracting impurities by direct liquid-liquid contact between amine and aqueous phosphoric acid. However, it is preferable to use a diluent which should have both high compatibility with the amine and substantially no compatibility with phosphoric acid. The aromatic hydrocarbons, such as benzene, toluene, xylene and naphthalene are particularly suitable as such diluents as are also the paraffin hydrocarbons, singly or in mixtures, such as octane, nonane, decane, undecane, dodecane, tridecane, tetradecane, pentadecane, hexadecane, heptadecane, octadecane, nonadecane, eicosane, and the like. A particularly preferred lowcost diluent is common kerosene, a fraction in the distillation of crude petroleum and exemplarily containing n-dodecane, naphthalene and 1- and 2-methyl-5,6,7,8 tetrahydronaphthalene.

It is often desirable to add also small quantities of various adjuvants to favor the solubility of amine salts in the diluent. Particularly effective as such adjuvants are the monoalcohols having from 7 to 18 carbon atoms, preferably those having 10 to 15 carbon atoms Also effective are monoalcohols produced by oxo-synthesis. Thus, alcohols which are useful singly or in mixtures as such adjuvants include the straight chained and branched heptylalcohols, octylalcohols, nonyl alcohols, cetyl alcohols, palmityl alcohol, margaryl alcohol, stearyl alcohol, octadecyl alcohols and in particular decylalcohols, undecyl alcohols, dodecylalcohols, lauryl alcohols, tridecyl alcohols, tetradecyl alcohols, including myristyl alcohol and pentadecyl alcohols. When such an adjuvant is added to the diluent it is advantageous to use from about 5% to 20% of the adjuvant based on the weight of diluent. As to the concentration of amine used, benefits of the instant invention can be obtained with solvents containing from about 5% to 100% by weight of the total solvent.

Although it is possible to eliminate the major part of the anionic impurities by treating in a discontinous manner, in one or more passes, a volume of phosphoric acid with one or more volumes of an amine-based solvent of the above described types, it is advantageous to effect this operation with a minimum of solvent. It is therefore preferable to carry out this operation in a counter-current manner thereby minimizing the quantity of solvent required and at the same time also lowering the amount of phosphoric acid extracted along with the anionic impurities.

The anionic impurities and small fraction of phosphoric acid extracted by the amine are then re-extracted by an aqueous solution of an alkaline substance like sodium hydroxide, sodium carbonate or ammonia. The obtained solution contains a mixture of phosphate, sulfate, fluosilicate and chloride containing all the anionic impurities of the acid removed by the amine extractor. When ammonia is used as the re-extracting agent, this solution is particularly useful as fertilizer. Alternatively, a portion of the phosphate ions contained in this solution mixture can be recovered by crystallization as ammonium phosphate crystals.

Before its recycling to the extraction train, the regenerated amine-based solvent is washed with water in one or more steps. This washing avoids contamination of subsequent batches of purified phosphoric acid by sodium or ammonium ions. The wash waters are then saved and used for dissolving the salts formed in the re-extraction step.

A preliminary treatment of the wet-process phosphoric acid with the purpose of removing sulfate ions or organic matter is no hindrance to the aforementioned stages of purification which are part of the instant method.

The reducing agent used to reduce the chromium and vanadium ions can be sodium sulfide or iron. When the reduction is effected by addition of sodium sulfide, any arsenic present in the phosphoric acid is precipitated as the sulfide. The final product resulting from the two-part extraction method of this invention is then an edible grade of phosphoric acid suitable for ultimate use with food products.

If the purified phosphoric acid obtained after treatment by the amine is lightly colored, it can be transformed into a colorless product having very high purity by treatment with activated carbon or also by treatment with an oxidizing agent, such as hydrogen peroxide, both kinds of treatment being applied according to conventional techniques.

This invention will be further illustrated by description in connection with the following specific examples of the practice of it, wherein, as also elsewhere herein, proportions are in parts by weight unless stated otherwise.

EXAMPLE 1

A train of liquid-liquid extractors has six extracting steps, five washing steps, three steps for re-extracting with water and one step for regenerating the solvent prior to recycling it to the extracting steps. In this example, this train is used for the counter-current treatment of one liter of a wet-process phosphoric acid whose composition is given in column 1 of Table 1 using 12 liters of a $C_5$ oxo-alcohol as extracting solvent.

This phosphoric acid is an aqueous solution corresponding to 53% by weight $P_2O_5$ whose organic matter is initially destroyed by a treatment with dichromate in the ratio of 3 grams of sodium dichromate per liter of the crude phosphoric acid. After this dichromate treatment, vanadium and the excess chromate are reduced by addition of 0.2 grams of iron powder per liter of phosphoric acid.

The solvent charged with phosphoric acid is then washed by a counter-current of 0.35 liters of water, next re-extracted by a counter current of 2 liters of water. The wash waters charged with phosphoric acid and impurities are recycled through the extraction stages. After re-extraction the solvent is regenerated by 0.1 liter of 50% aqueous sodium hydroxide.

In the course of this operation there is obtained 2.5 liters of phosphoric acid containing 302 grams/liter of $P_2O_5$, free of cationic impurities and 0.43 liters of sodium phosphate containing 155 grams/liter of $P_2O_5$ whose compositions are shown in columns (2) and (3) of Table I. At this stage, the purified acid still contains greater than negligible quantities of anionic impurities.

The residual phosphoric acid containing some anionic impurities and all the cationic impurities can be recycled after recovery of the dissolved alcohol to the train for sulfuric attack of mineral phosphate.

TABLE I

Compositions of Different Stages of Phosphoric Acid or Phosphates in Examples 1 and 2

| | 1 | 2 | 3 | 4 | 5 | 6 |
|---|---|---|---|---|---|---|
| | Initial Acid Before Alcohol Ex. 1&2 | Acid Purified By Alcohol Ex. 1&2 | Sodium Phosphate By-Product Ex. 1&2 | Acid Purified By Alamine 336 Example 2 | Ammonium Phosphate By-Product Example 2 | Purified Concentrated Acid Example 2 |
| % $P_2O_5$ | 53 | 25.2 | 13.4 | 38.1 | 28.8 | 54 |
| Impurities % on $P_2O_5$ | | | | | | |
| $SO_4$ | 4.1 | 3.1 | 1.4 | 0.0005 | 31 | 0.0005 |
| F | 0.85 | 0.32 | 0.61 | 0.01 | 2.7 | ≦0.005 |
| Cl | 0.15 | 0.16 | 0.09 | 0.0002 | 1.5 | 0.0001 |
| Fe | 1.05 | 0.0005 | 0.0002 | 0.0005 | 0.0004 | 0.0004 |
| Al | 0.58 | 0.0004 | 0.0002 | 0.0004 | 0.0004 | 0.0004 |
| V | 0.03 | 0.0003 | 0.0002 | 0.0003 | 0.0003 | 0.0003 |
| Cr | 0.14 | 0.0003 | 0.0003 | 0.0003 | 0.0003 | 0.0003 |
| Ca | 0.08 | 0.0004 | 0.0005 | 0.0004 | 0.0004 | 0.0004 |
| Na | 0.11 | 0.001 | | 0.001 | 0.001 | 0.001 |
| $NH_4$ | | | | 0.0005 | | 0.0005 |

After eliminating the $C_5$ oxo-alcohol contained in the phosphoric acid purified with alcohol and concentrating this acid to the strength of 40% by weight $P_2O_5$, 500 ml. of this phosphoric acid solution is treated just once in discontinuous manner with 500 ml. of a 0.5 molar solution of Alamine 336 in kerosene containing 12% by weight of a $C_{13}$ oxo-alcohol. Under these conditions the impurities based on the weight of $P_2O_5$ pass from 3.1% to 1.05% in the case of sulfates, from 0.3% to 0.12% in the case of fluoride and from 0.15% to 0.005% in the case of chloride. During the course of this purification, 14% of the treated phosphoric acid is extracted along with the anionic impurities.

EXAMPLE 2

In this Example, there is used a liquid-liquid extraction train or battery containing four extraction steps, one solvent-regeneration step, and two steps for washing regenerated solvent. In the extraction train, alcohol-purified phosphoric acid obtained in Example 1 is submitted to counter-current treatment by an amine solvent having the same composition as that described in Example 1. Both liquids travel at 0.5 liters per hour, in opposite directions.

Under these conditions, the phosphoric acid extracted by the amine is not greater than 10% as compared to the 14% in the preceding Example. On the other hand the extraction of anionic impurities is almost quantitative, as is shown in comparing the results in columns 2 and 4 of Table I.

The solvent containing all the anionic impurities and also said 10% of the phosphoric acid is then regenerated by gaseous ammonia and the washing solution coming from the steps in which the regenerated solvent is washed. There is thus obtained a solution of ammonium phosphate in amount corresponding to 350 grams/liter $P_2O_5$ containing also ammonium sulfate, chloride and fluosilicate according to the composition figures presented in column 5 of Table I. The ammonia is used in quantity such as to attain a pH between about 7 and 8. This solution has value as a fertilizer.

Before being recycled to the extraction, the regenerated solvent is washed in two steps with 80 ml/hour of water, this water serving to dissolve the ammonium salts obtained in the solvent-regeneration step.

The lightly-colored organic impurities in the amine-purified phosphoric acid are then oxidized by treatment with sufficient hydrogen peroxide. The acid is then concentrated to a 54% by weight $P_2O_5$ content. The last traces of fluoride are eliminated in the course of this concentration and the end-product is colorless phosphoric acid of very high purity whose composition is shown in column 6 of Table I.

EXAMPLE 3

This Example compares modifications of the instant invention using respectively a discontinuous and a counter-current procedure, both starting with phosphoric acid as purified and concentrated in Example 1 to a 40% $P_2O_5$ content.

Part A

A 500-ml sample of said acid is treated discontinuously with 500 ml of a 0.5 molar solution of Amberlite LA2 in kerosene containing 10% by weight of $C_{13}$ oxo-alcohol. The analytical compositions of the phosphoric acid before and after this amine treatment are given in Table II. These figures show that the levels of remaining sulfate and fluoride are divided by factors of 5 and 2.3 respectively. The proportion of the total phosphoric acid extracted by the amine along with the impurities is 10.2%.

TABLE II

Compositions of Phosphoric Acid Before and After Amine Treatment

| | % $P_2O_5$ | % $SO_4$ | % F |
|---|---|---|---|
| Before | 40 | 3.1 | 0.3 |
| After | 37.5 | 0.61 | 0.13 |

Part B

A corresponding purification is carried out in counter-current fashion using the liquid-liquid extraction train described in Example 2. The proportion of the total phosphoric acid extracted by the Amberlite LA2 is not greater than 8.1% whereas the levels of anionic impurities in the purified acid are only 5 ppm and 150 ppm respectively for sulfate and fluoride, the major part of this residual fluoride being subsequently eliminated during the concentration by evaporation of this pure acid.

EXAMPLE 4

Using a liquid-liquid extraction train like that of Example 1, a counter-current treatment by 10 liters of $C_7$ oxo-alcohol is given to one liter of wet-process phosphoric acid having a $P_2O_5$ content of 54% by weight, and having been freed of arsenic by the addition of sodium sulfide and having also had a preliminary treatment by addition of sodium dichromate for the purpose of destroying organic matter. After contacting the acid, this solvent is washed by 0.25 liters of the phosphoric acid obtained from the re-extraction steps then re-extracted by 1.4 liters of water and finally regenerated by concentrated aqueous sodium hydroxide before its recycling to the extraction. There is thus obtained 1.52 liters of phosphoric acid containing 460 grams/liter of $P_2O_5$ free of cationic impurities but still containing 3.4% sulfate, 0.1% chloride and 0.2% fluoride.

This alcohol-purified phosphoric acid is then treated in counter-current manner in the apparatus described in Example 2, by a 0.5 molar solution of Alamine 336 in kerosene containing 12% of $C_{13}$ oxo-alcohol. The different flow rates are: 0.5 liter per hour of phosphoric acid and of the amine solution of 0.1 liter per hour for the water washing the ammonium-regenerated solvent. After this treatment, elimination of traces of solvent by activated charcoal and concentration by evaporation to 54% $P_2O_5$ content, the colorless phosphoric acid obtained contains less than 200 ppm of cationic plus anionic impurities.

It will be understood that it is intended to cover all changes and modifications of the Examples of the invention herein chosen for the purpose of illustration which do not constitute departures from the spirit and scope of the invention.

We claim:

1. A method for purifying crude wet-process phosphoric acid containing at least one of vanadium or chromium as anionic metallic complexes which comprises, in combination:
    (A) treating crude wet-process phosphoric acid with sufficient amounts of a sulfide or metallic iron in aqueous medium to convert said anionic complexes of high oxidation levels to cationic forms of lower oxidation levels;
    (B) extracting the treated crude wet-process phosphoric acid of Step (A) with a water-immiscible solvent selected from the group consisting of monoalcohols and ethers having four to eight carbon atoms or mixtures thereof at a temperature of 20° to 60° C.;
    (C) removing cationic impurities from the treated medium of Step (B) by separating phosphoric acid containing anionic impurities in the water-immiscible solvent;
    (D) re-extracting the separated water-immiscible solvent of Step (C) at a temperature of 20° to 60° C. with water to permit the phosphoric acid and anionic impurities to be reextracted into a second aqueous phase;
    (E) contacting the second aqueous phase with a water-immiscible alkaline liquid medium having a poor dissolving power for phosphoric acid and containing from about 5% to 100% of a secondary or tertiary amine having from 18 to 60 carbon atoms so that the anionic impurities are transferred to said alkaline liquid medium; and
    (F) physically separating the second aqueous phase containing purified phosphoric acid.

2. The method of claim 1 wherein the alkaline medium contains the amine and a diluent.

3. The method of claim 1 wherein the solvent for phosphoric acid used in step (B) is an Oxo-alcohol.

4. The method of claim 1 wherein the water immiscible solvent of step (B) is an ether.

5. The method of claim 1 wherein the second aqueous phase is concentrated by evaporation to a $P_2O_5$ content of at least about 35-45% by weight before contacting the alkaline medium as in step (3).

6. The method of claim 3 wherein the diluent is common kerosene.

7. The method of claim 2 wherein the diluent contains also from about 5% to 20%, based on the weight of diluent, of one or more monoalcohols having from 7 to 18 carbon atoms.

8. The method of claim 7 wherein the monoalcohol is an alcohol produced by oxo-synthesis.

9. The method of claim 1 wherein the charged solvent, after being physically separated as in step (C) but before being re-extracted by an aqueous phase, is first washed one or more times with water, and wherein the wash waters thus obtained are used as diluent for alkali or ammonia to be used for regenerating the extracting solvents of steps (B) and (D) respectively.

10. The method of claim 1 wherein the charged solvent of step (B), after re-extraction of phosphoric acid into the second aqueous phase as in step (D), is regenerated with aqueous concentrated sodium hydroxide solution to produce a solvent sufficiently pure for recycling in step (B) and simultaneously to form a by-product aqueous sodium phosphate solution.

11. Method of claim 10 wherein the charged solvent of step (B), after being physically separated as in step (C) but before being re-extracted by an aqueous phase, is first washed one or more times with water, and wherein the wash waters thus obtained are used in preparing the sodium hydroxide solution.

12. The method of claim 1 wherein the alkaline liquid medium, after its extraction of the anionic impurities and a quantity of the phosphoric acid, is regenerated by treating it with ammonia and water to produce a regenerated alkaline solvent sufficiently pure for recycling in step (D) and a by-product aqueous ammonium phosphate solution.

13. The method of claim 1 wherein there is added to the purified phosphoric acid a quantity of hydrogen peroxide sufficient to remove any coloring matter contained therein.

* * * * *

UNITED STATES PATENT AND TRADEMARK OFFICE
CERTIFICATE OF CORRECTION

PATENT NO. : 4,108,963
DATED : August 22, 1978
INVENTOR(S) : Jean-Pierre Cuer and Antoine Floreancig It is certified that error appears in the above-identified patent and that said Letters Patent are hereby corrected as shown below:

Column 1, line 68, reads "1051", should read --1052--

Column 2, line 18, reads "3,865,439, Aug. 15, 1971", should read -- 3,684,439, Aug. 15, 1972--

Column 3, line 1, reads "use a", should read --use as--

Column 10, line 17, reads "claim 3", should read --claim 2--

Signed and Sealed this

Twenty-fourth Day of July 1979

[SEAL]

Attest:

LUTRELLE F. PARKER

Attesting Officer   Acting Commissioner of Patents and Trademarks